(12) United States Patent
Patten et al.

(10) Patent No.: US 9,590,970 B2
(45) Date of Patent: Mar. 7, 2017

(54) METHODS, SYSTEMS, AND COMPUTER PROGRAM PRODUCTS FOR OPERATING A COMMUNICATION NETWORK TO FACILITATE THE SECURE SHARING OF CONTENT AMONG MULTIPLE ENDPOINTS

(71) Applicant: eFace2Face, Inc., St Petersburg, FL (US)

(72) Inventors: David Patten, Clearwater, FL (US); Sergio Garcia Murillo, Madrid (ES); Carl Treleaven, Pinellas Park, FL (US)

(73) Assignee: eFace2Face, Inc., St. Petersburg, FL (US)

( * ) Notice: Subject to any disclaimer, the term of this patent is extended or adjusted under 35 U.S.C. 154(b) by 0 days.

(21) Appl. No.: 14/681,687

(22) Filed: Apr. 8, 2015

(65) Prior Publication Data
US 2015/0288672 A1 Oct. 8, 2015

Related U.S. Application Data

(60) Provisional application No. 61/976,788, filed on Apr. 8, 2014.

(51) Int. Cl.
| | | |
|---|---|---|
| *G06F 7/04* | (2006.01) | |
| *H04L 29/06* | (2006.01) | |
| *H04L 29/08* | (2006.01) | |
| *G06F 17/30* | (2006.01) | |
| *G06F 21/00* | (2013.01) | |
| *G06F 21/64* | (2013.01) | |

(52) U.S. Cl.
CPC ........ *H04L 63/08* (2013.01); *G06F 17/30011* (2013.01); *G06F 17/30893* (2013.01); *G06F 21/00* (2013.01); *G06F 21/64* (2013.01); *H04L 63/0884* (2013.01); *H04L 63/10* (2013.01); *H04L 63/104* (2013.01); *H04L 65/1076* (2013.01); *H04L 65/403* (2013.01); *H04L 65/60* (2013.01); *H04L 67/1095* (2013.01); *H04L 67/1097* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 6,289,460 B1 * | 9/2001 | Hajmiragha | G06F 17/30011 700/83 |
| 8,407,773 B1 * | 3/2013 | Hayter | H04L 67/16 726/7 |
| 2002/0078102 A1 | 6/2002 | Dutta | |

OTHER PUBLICATIONS

Notification of Transmittal of the International Search Report and the Written Opinion of the International Searching Authority, or the Declaration, in corresponding PCT Application No. PCT/IB2015/052568, mailed Jul. 3, 2015 (11 pages).

* cited by examiner

*Primary Examiner* — Brandon Hoffman
(74) *Attorney, Agent, or Firm* — Myers Bigel, P.A.

(57) ABSTRACT

A method includes performing operations as follows on a processor: initiating an outgoing connection to the communication session, establishing communication with a client device via the communication session, providing the client device with access to content that is stored at a remote storage location separate from the client device, and authorizing a modification to the content at the remote storage location via the client device.

43 Claims, 7 Drawing Sheets

METHODS, SYSTEMS, AND COMPUTER PROGRAM PRODUCTS FOR OPERATING A COMMUNICATION NETWORK TO FACILITATE THE SECURE SHARING OF CONTENT AMONG MULTIPLE ENDPOINTS

CROSS-REFERENCE TO RELATED APPLICATION

This application claims the benefit of U.S. Provisional Application No. 61/976,788 filed Apr. 8, 2014, the disclosure of which is hereby incorporated herein by reference.

BACKGROUND

The present disclosure relates to communication networks and, more particularly, to communication networks that facilitate secure sharing of content and collaboration among multiple endpoints.

Web conferencing refers to a service that typically allows multi-media applications to be shared among multiple users dispersed in remote locations. The service is generally based on TCP/IP connections over the Internet and may provide for real time communication through both point-to-point connections as well as multi-point connections. The connections may support a variety of types of data streams including audio, video, and text. One application of web conferencing technology is digital engagement of customers through online chat. Businesses may allow customers who are visiting a website to connect to an expert that may provide customers with product/service information, technical support, and/or other type of assistance. These sessions may involve text messaging, audio interaction, and/or video interaction. The communication sessions between customers and experts may use physical identifiers between expert stations and remote stations in implementing routing schemes. In some instances, a business may use different communication links for audio/video conferencing and content sharing.

SUMMARY

In some embodiments of the inventive subject matter, a method of operating a server device comprises performing operations as follows on a processor: initiating an outgoing connection to a communication session, establishing communication with a client device via the communication session, providing the client device with access to content that is stored at a remote storage location separate from the client device, and authorizing a modification to the content at the remote storage location via the client device.

In other embodiments, the method further comprises receiving an invitation to join the communication session, wherein initiating the outgoing connection comprises initiating the outgoing connection to the communication session responsive to receiving the invitation to join the communication session.

In still other embodiments, the invitation comprises a unique identifier that identifies the communication session and initiating the outgoing connection to the communication session comprises transmitting a unique identifier to a collaboration server that manages the communication session that identifies the communication session.

In still other embodiments, authorizing the modification to the content comprises requesting a user of the client device display a form of user identification through a video channel of the communication session, receiving the user identification over the video channel, and validating an identity of the user based on credentials contained on the user identification.

In still other embodiments, the method further comprises embedding a picture of the user of the client device in the content that is obtained from the user identification.

In still other embodiments, validating the identity of the user further comprises communicating the credentials to an identity verification entity and receiving a validation of the identity of the user from the verification entity.

In still other embodiments, authorizing the modification to the content comprises presenting a user of the client device with at least one question, receiving responses from the user of the client device to the at least one question, and authorizing the modification to the content responsive to the responses received from the user of the client device.

In still other embodiments, authorizing the modification to the content comprises transmitting a prompt to a user of the client device that provides guidance in performing the modification to the content.

In still other embodiments, the content is a document and the modification is an electronic signature.

In still other embodiments, establishing communication with the client device comprises establishing communication with a plurality of client devices via the communication session.

In still other embodiments, providing the client device with access to the content comprises providing the plurality of client devices with access to content that is stored at the remote storage location separate from the plurality of client devices.

In still other embodiments, the client device is a first one of the plurality of client devices. Authorizing the modification to the content at the remote storage location via the first one of the plurality of client devices comprises authorizing the modification to the content at the remote storage location via the first one of the plurality of client devices while blocking other ones of the plurality of client devices from modifying the content.

In still other embodiments, the method further comprises authorizing a modification to the content at the remote storage location via a second one of the plurality of client devices while blocking the other ones of the plurality of client devices from modifying the content.

In still other embodiments, the method further comprises video recording the modification to the content by a user of the first one of the plurality of client devices along with users of the other ones of the plurality of client devices and generating a log file with a date and time stamp when the modification to the content occurred.

In still other embodiments, the communication session comprises a Virtual Network Computing (VNC) communication session and establishing communication with the client device via the communication session comprises establishing communication with the client device using Session Initiation Protocol (SIP) signaling.

In further embodiments of the inventive subject matter, a method of operating a client device comprises performing operations as follows on a processor: initiating an outgoing connection to the communication session, establishing communication with a server device via the communication session, receiving from a server device access to content that is stored at a remote storage location, receiving a user authorization request from the server device, transmitting information identifying the user to the server device, receiving authorization to modify the content at the remote storage location, and modifying the content at the remote storage location.

In still further embodiments, the method further comprises receiving an invitation to join the communication session. Initiating the outgoing connection comprises initiating the outgoing connection to the communication session responsive to receiving the invitation to join the communication session.

In still further embodiments, the invitation comprises a unique identifier that identifies the communication session and initiating the outgoing connection to the communication session comprises transmitting a unique identifier to a collaboration server that manages the communication session that identifies the communication session.

In still further embodiments, the user authorization request comprises a request for the user to display a form of user identification through a video channel of the communication session and the information identifying the user comprises the form of user identification.

In still further embodiments, the user authorization request comprises at least one question and the information identifying the user comprises responses from the user of the client device to the at least one question.

In still further embodiments, the content is a document and modifying the content comprises modifying the content with an electronic signature.

In still further embodiments, establishing communication with the server device via the communication session comprises establishing communication with the server device using a noVNC browser.

In still further embodiments, the communication session comprises a Virtual Network Computing (VNC) communication session and establishing communication with the server device via the communication session comprises establishing communication with the server device using Session Initiation Protocol (SIP) signaling.

In other embodiments of the inventive subject matter, a server device comprises a processor and a memory coupled to the processor and comprising computer readable program code embodied in the memory that when executed by the processor causes the processor to perform operations comprising: initiating an outgoing connection to the communication session, establishing communication with a client device via the communication session, providing the client device with access to content that is stored at a remote storage location separate from the client device, and authorizing a modification to the content at the remote storage location via the client device.

In still other embodiments, the operations further comprise receiving an invitation to join the communication session. Initiating the outgoing connection comprises initiating the outgoing connection to the communication session responsive to receiving the invitation to join the communication session.

In still other embodiments, the communication session comprises a Virtual Network Computing (VNC) communication session and establishing communication with the client device via the communication session comprises establishing communication with the client device using Session Initiation Protocol (SIP) signaling.

In further embodiments of the inventive subject matter, a computer program product for operating a server device comprises a tangible computer readable storage medium comprising computer readable program code embodied in the medium that when executed by a processor causes the processor to perform operations comprising: initiating an outgoing connection to the communication session, establishing communication with a client device via the communication session, providing the client device with access to content that is stored at a remote storage location separate from the client device, and authorizing a modification to the content at the remote storage location via the client device.

In still further embodiments, the operations further comprise: receiving an invitation to join the communication session. Initiating the outgoing connection comprises initiating the outgoing connection to the communication session responsive to receiving the invitation to join the communication session.

In still further embodiments, the communication session comprises a Virtual Network Computing (VNC) communication session and establishing communication with the client device via the communication session comprises establishing communication with the client device using Session Initiation Protocol (SIP) signaling.

In other embodiments of the inventive subject matter, a client device comprises a processor and a memory coupled to the processor and comprising computer readable program code embodied in the memory that when executed by the processor causes the processor to perform operations comprising: initiating an outgoing connection to the communication session, establishing communication with a server device via the communication session, receiving from a server device access to content that is stored at a remote storage location, receiving a user authorization request from the server device, transmitting information identifying the user to the server device, receiving authorization to modify the content at the remote storage location, and modifying the content at the remote storage location.

In still other embodiments, the operations further comprise receiving an invitation to join the communication session. Initiating the outgoing connection comprises initiating the outgoing connection to the communication session responsive to receiving the invitation to join the communication session.

In still other embodiments, the communication session comprises a Virtual Network Computing (VNC) communication session and establishing communication with the server device via the communication session comprises establishing communication with the server device using Session Initiation Protocol (SIP) signaling.

In further embodiments of the inventive subject matter, a computer program product for operating a client device comprises a tangible computer readable storage medium comprising computer readable program code embodied in the medium that when executed by a processor causes the processor to perform operations comprising: initiating an outgoing connection to the communication session, establishing communication with a server device via the communication session, receiving from a server device access to content that is stored at a remote storage location, receiving a user authorization request from the server device, transmitting information identifying the user to the server device, receiving authorization to modify the content at the remote storage location, and modifying the content at the remote storage location.

In still further embodiments, the operations further comprise receiving an invitation to join the communication session. Initiating the outgoing connection comprises initiating the outgoing connection to the communication session responsive to receiving the invitation to join the communication session.

In still further embodiments, the communication session comprises a Virtual Network Computing (VNC) communication session and establishing communication with the server device via the communication session comprises establishing communication with the server device using Session Initiation Protocol (SIP) signaling.

In other embodiments of the inventive subject matter, a computer system, comprises an agent server, a collaboration server that is configured to establish a communication session between the agent server and a plurality of plurality of client devices, a Virtual Network Computing (VNC) bridge server that is configured to provide each of the agent server and the plurality of client devices access to desktops of other ones of the agent server and the plurality of client devices to view content that is stored at a remote storage location separate from the plurality of client devices, and a Multipoint Control Unit (MCU) that is configured to provide one of the plurality of client devices with modification access to the content at the remote storage location while blocking other ones of the plurality of client devices from modifying the content responsive to a modification authorization from the agent server.

In still other embodiments, the communication session is established over an Internet Protocol Multimedia Subsystem (IMS) communication network using Session Initiation Protocol (SIP) signaling.

In still other embodiments, the IMS network comprises a Virtual Private Network (VPN).

In still other embodiments, the collaboration server is configured to establish the communication session between the agent server and the plurality of client devices without using static identifiers for the agent server and the plurality of client devices.

In still other embodiments, the collaboration server is further configured to establish the communication session using a Back-to-Back User Agent (B2BUA) server.

In still other embodiments, the VNC bridge server is further configured to use secure websockets to provide each of the agent server and the plurality of client devices access to the desktops of the other ones of the agent server and the plurality of client devices.

In still other embodiments, each of the plurality of client devices is an IP device.

In still other embodiments, the agent server is further configured to video record the modification to the content by a user of the first one of the plurality of client devices along with users of the other ones of the plurality of client devices, and generate a log file with a date and time stamp when the modification to the content occurred.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
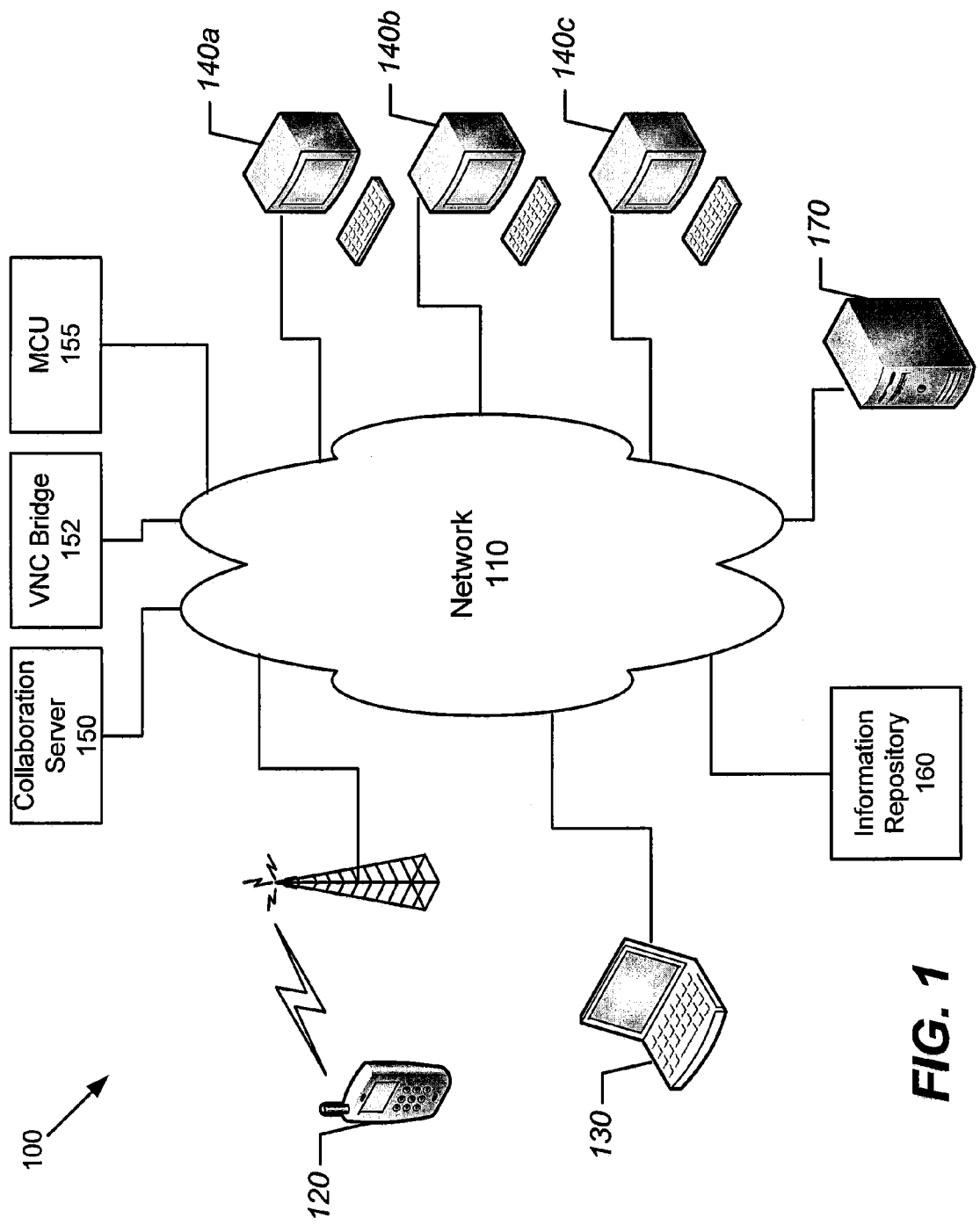
FIG. 1 is a block diagram that illustrates a system/communication network for facilitating the secure sharing of content among multiple endpoints in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. A mobile device may also include a frequency modulated (FM), amplitude modulated (AM), and/or satellite radio receiver for receiving radio transmissions. Mobile devices may also be referred to as "pervasive computing" devices.

As used herein, the term "IP terminal or device" refers to a terminal or device that may communicate using the Session Initiation Protocol (SIP). It will be understood that an IP terminal or device may also refer to devices that communicate using SIP via a media gateway, which translates communications, for example, between an IP network and another network, such as the public switched telephone network or a circuit switched wireless network. An "IP terminal or device" may also have a Web browser that executes thereon to navigate a Web page, which has a Javascript based SIP client stack. As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

Some embodiments are described herein with respect to a product manufacturer, retailer, wholesaler, and/or service provider, for example, providing agents to provide assistance to remote users and/or customers through communication sessions involving two-way video, one-way video, audio, and/or text/chat. Using standard Internet connections and standard Web browsers without the need of extra plugins when using Web RTC/HTML5 compliant browsers, users are able to connect to agents to experience high definition/business quality video communications and, during the connection, agents are able to dynamically and securely share content without the need for additional connections or circuits and without the need to store the content on the user's communication device. The origin of the content that is shared between a user and an agent, for example, may come from a variety of different sources including, but not limited to, computers, servers, databases, and other information repositories located local to or remote from the user and/or agent. By not storing certain content on a user's computer, security can be improved.

In some embodiments of the inventive subject matter, users and agents can operate from stationary and/or mobile devices as the communication session end-points are not bound by specific identifiers, such as IP addresses, MAC addresses, Uniform Resource Identifiers (URIs), and/or URLs. Thus, multiple agents and/or users can be conferenced together dynamically.

The Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP.

Referring to FIG. 1, an exemplary communication network 100, according to some embodiments of the inventive subject matter, includes a network 110 including a SIP infrastructure network, which may provide connectivity between user/client devices 120 and 130 and agent server devices/stations 140a, 140b, and 140c. A user/client device 120, 130 and/or agent server station/device 140a, 140b, 140c may connect to the network 110 using any of a number of different interfaces generally depending on the nature of the device. The user/client devices 120, 130 and/or agent server stations 140a, 140b, 140c may be mobile and/or stationary IP devices that are capable of communicating using SIP.

The network 110 may represent a global network, such as the Internet, or other publicly accessible network. The network 110 may also, however, represent a wide area network, a local area network, an Intranet, or other private network, which may not be accessible by the general public. Furthermore, the network 110 may represent a combination of public and private networks or a virtual private network (VPN). The network 110 may comprise a SIP infrastructure network that includes apparatus configured to provide a variety of different SIP core functions linked by standardized or proprietary interfaces. Generally, functions of a SIP infrastructure include a bundle of functions of SIP servers or proxies, which are used to process SIP signaling packets in the SIP infrastructure. Functions provided by the SIP servers (Stateless or Statefull proxies, Registrars, and Back-to-Back User Agent (B2BUA)) may include: registration of devices with the SIP infrastructure; routing and inspection of signaling messages; authentication of users and establishment of security associations; compression, decompression and other signal processing functions; authorization of resources; policy enforcement; bandwidth management; and generation of charging records. An IMS network is a kind of SIP infrastructure.

The SIP proxy functions as an interface to the SIP infrastructure for IP terminals/devices 120, 130, 140a, 140b, and 140c. The Registrar may enable the registration of IP terminals/devices and one or more B2BUA servers may provide the routing of SIP and/or I-ITTP signaling messages between the devices and service providers. A database may maintain a service profile and other information for each end-user and associated IP terminal/device that has registered with the SIP infrastructure. The profile and other information may include, but is not limited to, IP address information, roaming information, and/or telephony services information.

A collaboration server 150 implementing a SIP B2BUA server may facilitate the establishment of communication sessions between user/client devices 120, 130 and agent server stations 140a, 140b, 140c. In some embodiments, the user/client devices 120, 130 and agent server stations 140a, 140b, 140c may include browsers based on the Web (Real Time Communication) WebRTC API platform. The browsers may provide an interface for establishing a text, audio, and/or video call between the user/client devices 120, 130 and agent server stations 140a, 140b, 140c. The collaboration server 150 may manage the routing of calls between the user/client devices 120, 130 and agent server stations 140a, 140b, 140c based on SIP. Use of the SIP protocol allows user/client devices 120, 130 and agent server stations 140a, 140b, 140c to be assigned dynamic SIP addresses, which are used in routing the calls and establishing the communication sessions. Thus, the user/client devices 120, 130 and agent server stations 140a, 140b, 140c may be IP terminals/devices according to some embodiments of the inventive subject matter. As a result, users and agents can be connected based on a selection made by a user and/or agent in a browser, for example, using logical routing rather than computer specific routing based on hard coded IP addresses and/or MAC addresses. The collaboration server 150 may also use the user's geolocation information to route the call to the nearest available agents and/or licensed agents for specific regions. The collaboration server 150 may use multiple types of queuing techniques to schedule connections to agent server stations 140a, 140b, 140c when all agents are currently busy or, for example, when an agent with a particular expertise is busy even though other agents may be available. These queuing techniques may include, but are not limited to, round robin scheduling, least called scheduling, random scheduling, sequential scheduling, and weighted scheduling.

In accordance with various embodiments of the inventive subject matter, both two-party communication sessions may be established and multi-party communication sessions may be established with various combinations of two-way video, one-way video, audio, and/or text.

The agent server stations 140*a*, 140*b*, and 140*c* can share content with the user/client devices 120 and 130 using the same communication channels used to carry the audio, video, and/or text information. That is, multi-media sessions may be created in which agent server stations 140*a*, 140*b*, and 140*c* may share content and one or more of audio/video over the same communication channel. According to some embodiments of the inventive subject matter, the agent provides the user with access to the content, but doesn't transmit the content to the user. Content can be obtained from a variety of sources including, but not limited to, one or more information repositories 160, one or more servers 170, and other public or private databases. These content sources may be local to or remote from the agent server stations 140*a*, 140*b*, 140*c* and are remote from the user/client devices 120 and 130. In some embodiments of the inventive subject matter, the agent server devices 140*a*, 140*b*, and 140*c* may manage the sharing of content with one or more user/client devices 120, 130, such that the content is never transmitted or stored on a user/client device 120, 130 for improved security. Secure websockets may be used for Virtual Network Computing (VNC) sharing, which is not used for audio/video, which use SRTP/UDP/IP. Chat may also be sent over secure websockets, but via a different server.

In some embodiments of the inventive subject matter, VNC is used for allowing agent server stations 140*a*, 140*b*, and 140*c* to collaborate and share content with user/client devices 120, 130. VNC is a graphical desktop sharing system that uses the Remote Frame Buffer (RFB) protocol to remotely control another computer. VNC allows keyboard and/or mouse events to be transmitted from one computer to another and relays the graphical screen updates back in the other direction over a network. The collaboration server 150, via a VNC Bridge server 152 and a Multipoint Control Unit (MCU) 155 allows a VNC server installed on an agent's computer and one or several VNC clients (either with the software installed on their computer or via an HTMLVNC viewer) associated with the user devices 120, 130 to be connected in a VNC sharing session. All of the participants in a sharing session may initiate an outgoing connection to the VNC Bridge server 152 that will allow the sharing session to be established without the need of setting up port forwarding required by some network environments doing Network Address Translation (NAT). Matching of incoming connections of the same sharing session is done by a special unique identifier generated by the collaboration server 150, which is announced to all participants when the audio and/or video call is established. For example, the unique identifier could be communicated as part of a link, URI, URL, or the like sent to the user/client devices 120, 130 and agent servers 140*a*, 140*b*, 140*c* as part of establishing the multi-party communication session. The MCU 155 may provide the owning agent server 140*a*, 140*b*, 140*c* the control of which participating user/client device 120, 130 is allowed to act as a "presenter" (i.e., will start the VNC server connection against the VNC bridge) and which of the presenters act as an "editor" (i.e. will have control of the mouse and keyboard input during the sharing session).

Although FIG. 1 illustrates a system for facilitating the secure sharing of content among multiple endpoints according to some embodiments of the inventive subject matter it will be understood that embodiments of the present invention are not limited to such configurations, but are intended to encompass any configuration capable of carrying out the operations described herein.

Figure 2:
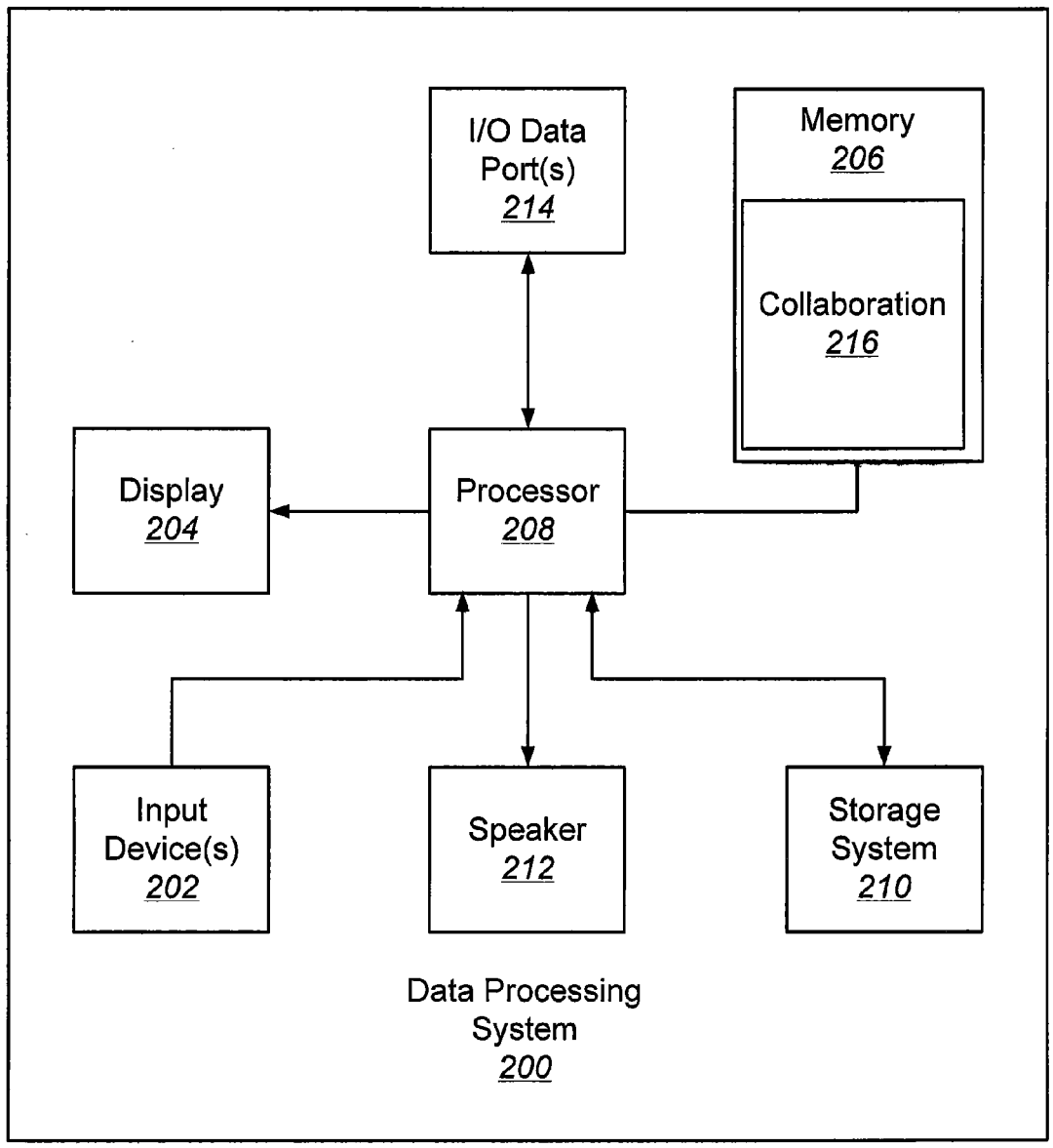
FIG. 2 is a block diagram that illustrates a data processing system to facilitate secure sharing of content among multiple endpoints in accordance with some embodiments of the inventive subject matter.

FIG. 2 is a block diagram that illustrates a data processing system to facilitate the secure sharing of content among multiple endpoints and may be used to implement the agent stations 140*a*, 140*b*, and 140*c* according to some embodiments of the inventive subject matter. Referring now to FIG. 2, a data processing system 200, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, flash drives, USB drives, hard disks, or the like, as well as virtual storage, such as a RAMDISK or cloud storage. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a collaboration module 216 that may provide functionality for establishing communication with one or more client devices as part of a multi-party communication session and to control access to one or more items of content by the client devices so that the users of the client devices may modify the content in a secure manner.

Figure 3:
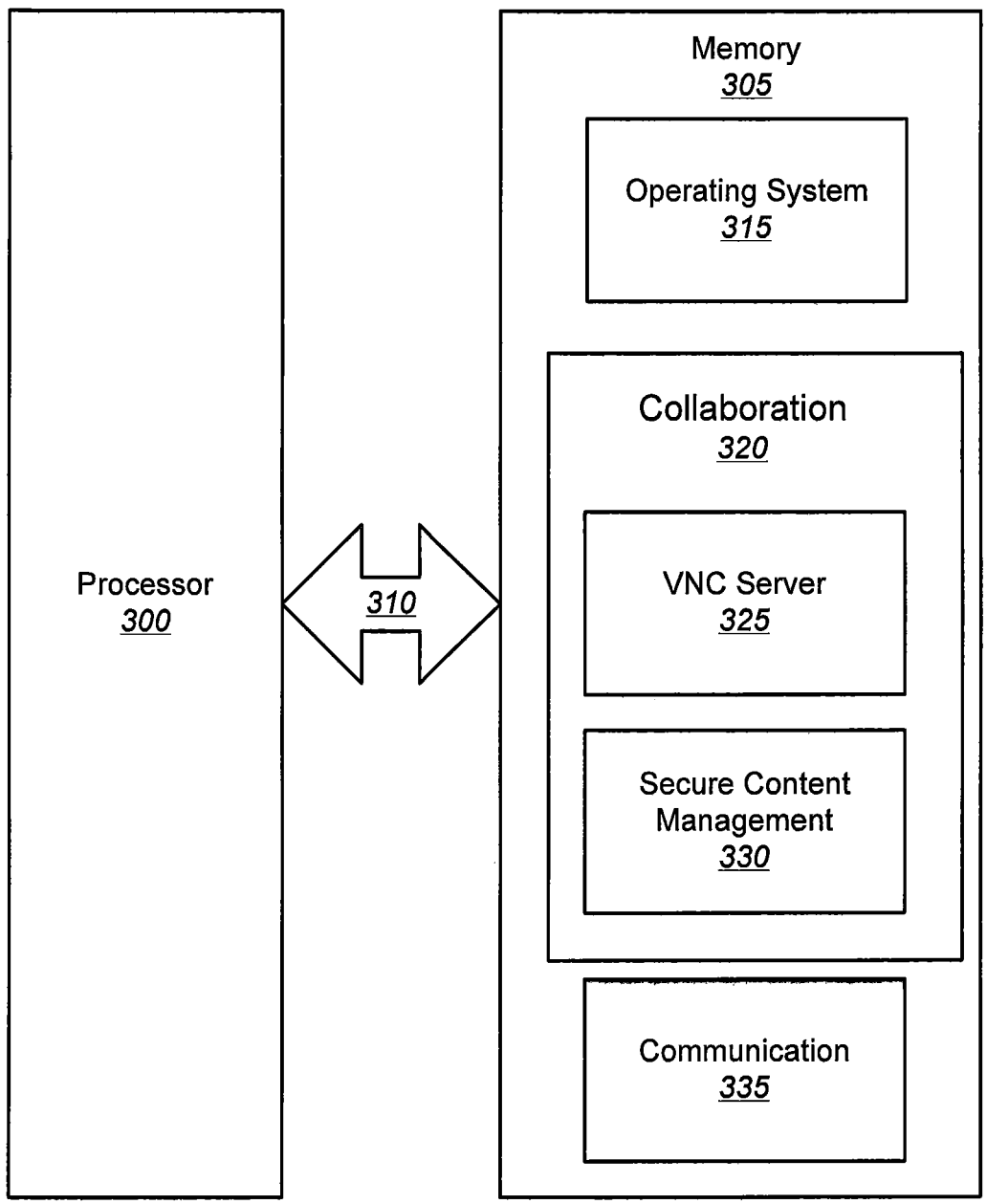
FIG. 3 is a block diagram that illustrates a software/hardware architecture for the data processing system of FIG. 2 in accordance with some embodiments of the inventive subject matter.

FIG. 3 illustrates a processor 300 and memory 305 that may be used in embodiments of data processing systems, such as the data processing system 200 of FIG. 2, respectively, for facilitating the secure sharing of content among multiple endpoints according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating data center floor plan mapping using a location aware-device in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain three or more categories of software and/or data: an operating system 315, a collaboration module 320, and a communication module 335. In particular, the operating system 315 may manage the data processing system's software and/or hardware resources and may coordinate execution of programs by the processor 300. The collaboration module 320 may correspond to the collaboration module 216 of FIG. 2 and may comprise a VNC server module 325 and a secure content management module 330. The VNC server module 325 may be downloaded, for example, from the collaboration server 150 and may implement the VNC server protocol for graphical desktop sharing. The VNC server module 325 may allow client or user devices running a VNC client or viewer program, such as user devices 120, 130, to take control of the VNC server's screen. The secure content management module 330 may be configured to cooperate with the VNC server module 325 to control access by client devices, such as user devices 120, 130, to one or more items of content that are stored remotely from the client devices in a secure manner, i.e., the content is not downloaded to the client devices but remains securely stored in its remote location. The secure content management module 330 may provide authorization functionality to validate the identity of the user(s) operating the client device(s) before allowing the user(s) to modify a content item. The secure management module 330 may further arbitrate and schedule modification access to the content among multiple client devices(s). For example, only one user of a client device may be allowed to access to modify an item of content at any one time with users of other client devices being blocked from modifying the content item and, in some embodiments, viewing the content item while the other party is modifying the content item. Various textual, audio, and/or video prompts may be provided to users of client device(s) to assist the users in accessing and/or modifying the content item(s). The communication module 335 may be configured to facilitate communication between the data processing system 200/agents 140*a*, 140*b*, 140*c* and other entities, such as the collaboration server 150, VNC bridge server 152, MCU 155, user devices 120, 130, information repository 160, and server(s) 170.

Although FIG. 3 illustrates hardware/software architectures that may be used in data processing systems, such as the data processing system 200 of FIG. 2 for facilitating the secure sharing of content among multiple endpoints according to some embodiments of the inventive subject matter, it will be understood that the present invention is not limited to such a configuration, but is intended to encompass any configuration capable of carrying out operations described herein.

Figure 4:
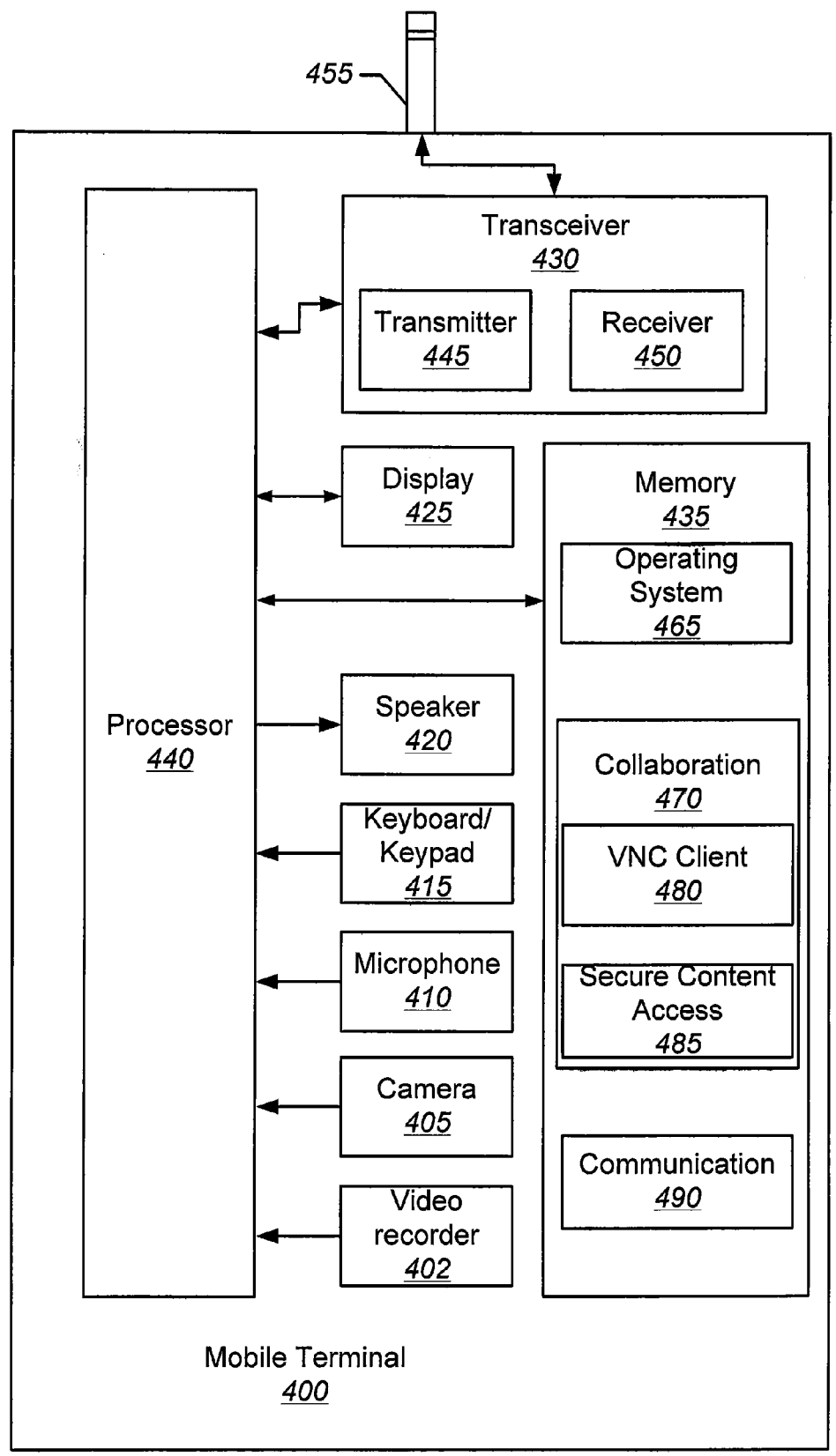
FIG. 4 is a block diagram that illustrates a user/client device/mobile terminal to facilitate secure sharing of content among multiple endpoints in accordance with some embodiments of the inventive subject matter.

FIG. 4 is a block diagram that illustrates user device 120 implemented as a mobile terminal client device that facilitates the secure sharing of content among multiple endpoints according to some embodiments of the inventive subject matter. In accordance with some embodiments of the inventive subject matter, the mobile terminal 400 includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitate the secure sharing of content among multiple endpoints in accordance with some embodiments of the inventive subject matter. The memory 435 may include, but is not limited to, the following types of devices: cache, ROM, PROM, EPROM, EEPROM, flash, SRAM, and DRAM.

As shown in FIG. 4, the memory 435 may contain three or more categories of software and/or data: an operating system 465, a collaboration module 470, and a communication module 490. The operating system 465 generally controls the operation of the mobile terminal 400. In particular, the operating system 465 may manage the mobile terminal's software and/or hardware resources and may coordinate execution of programs by the processor 440.

The collaboration module 470 may comprise a VNC client module 480 and a secure content access module 485. The VNC client module 480 may be downloaded, for example, from the collaboration server 150 and may implement the VNC client or viewer protocol for graphical desktop sharing. The VNC client module 480 may be used to view and/or take over the screen of a device/system running a VNC server module 325, such as agents 140*a*, 140*b*, and 140*c*. The secure content access module 485 may cooperate with the VNC client module 480 to access one or more items of content for viewing and/or modification. The agent 140*a*, 140*b*, 140*c* may require that the user provide some sort of information that identifies the user of the client device. The secure content access module 485 may provide such information in different ways in accordance with various embodiments of the inventive subject matter. For example, the user of the client device may provide a picture, may provide an image of some form of credentials, such as a driver's license, over a video channel of the communication session, and/or may provide responses to one or more questions that can be used to validate the user's identity. The communication module 490 may be configured to facilitate communication between the data mobile terminal 400/user device 120 and other entities, such as the agents 140*a*, 140*b*, 140*c*, collaboration server 150, VNC bridge server 152, MCU 155, information repository 160, and server(s) 170.

Although the collaboration module 470 has been described above as embodied in a mobile terminal 400/mobile user device 120, it will be understood that the collaboration module 470 may also be embodied in other user/client devices, such as user device 130. These user devices may include a variety of data processing system devices including, but not limited to, desktop computers, laptop computers, and the like.

Although FIG. 4 illustrates an exemplary software and hardware architecture that may be used for facilitating the secure sharing of content among multiple endpoints according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 2-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the data processing system 200 of FIG. 2, hardware/software architecture of FIG. 3, and mobile device 400 of FIG. 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 2-4 may be used to facilitate the secure sharing of content among multiple endpoints according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208, memory 305 coupled to the processor 300, and memory 435 coupled to the processor 440 include computer readable program code that, when executed by the respective processors, causes the respective processors to perform operations including one or more of the operations described herein with respect to FIGS. 5-7.

Figure 5:
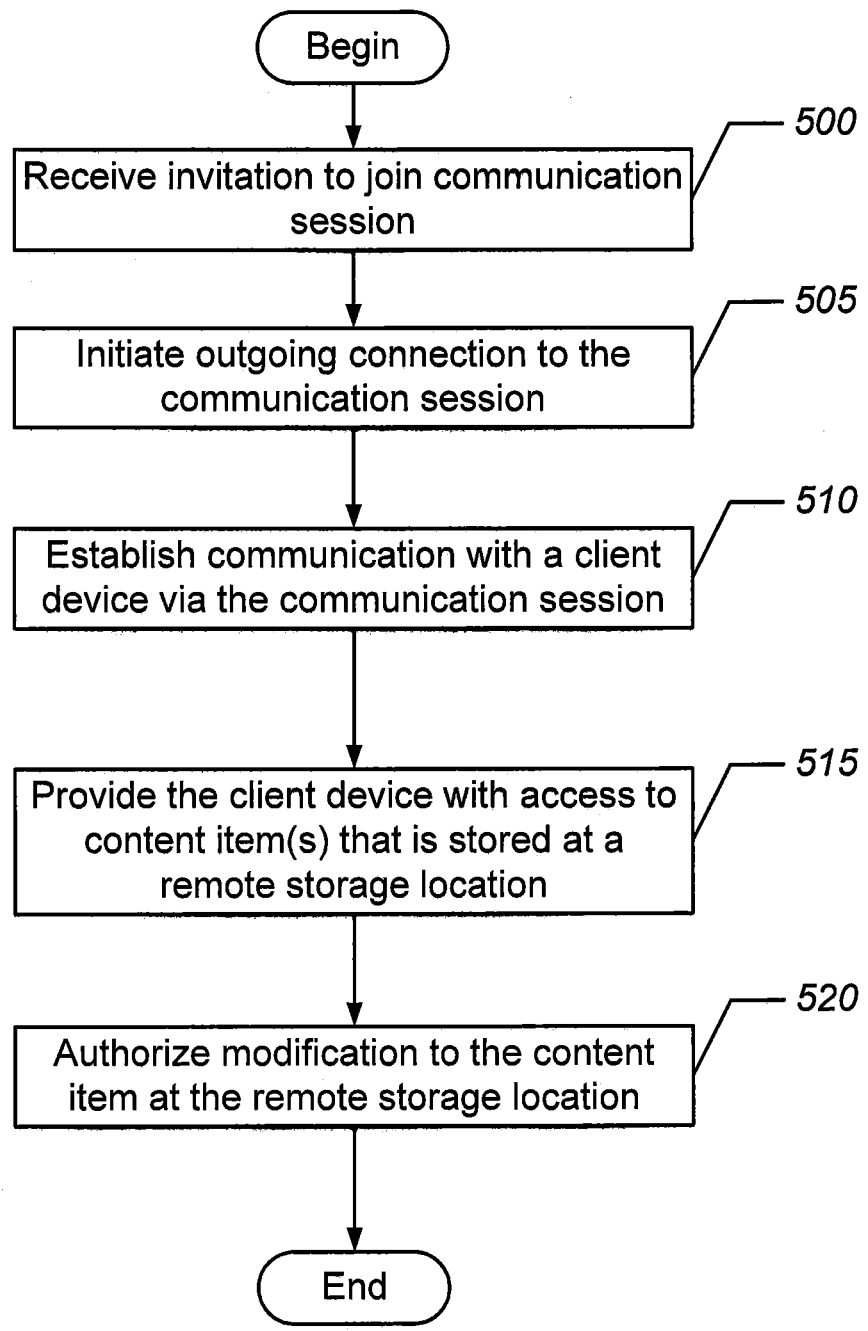
FIGS. 5-7 are flow charts that illustrate operations for facilitating secure sharing of content among multiple endpoints in accordance with some embodiments of the inventive subject matter.
Figure 6:
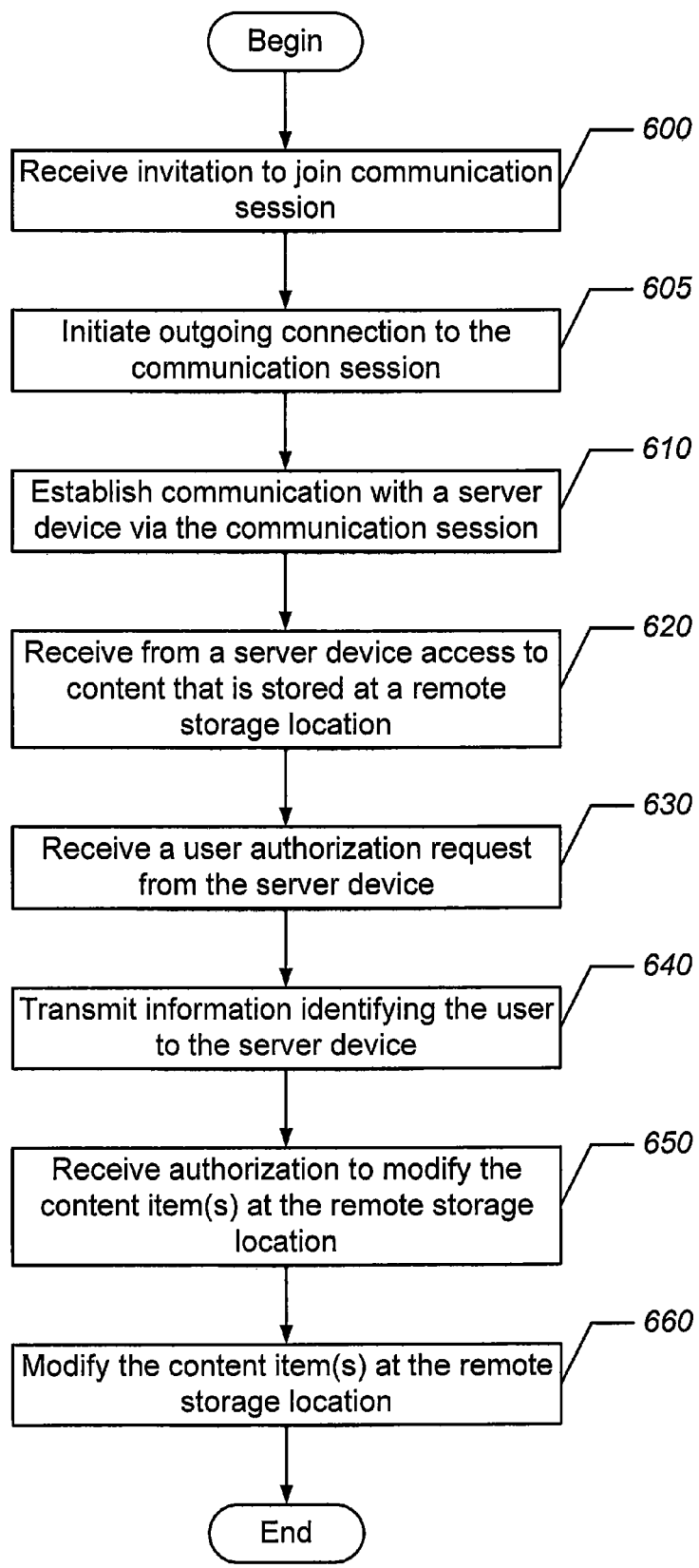

FIGS. 5 and 6 are flow charts that illustrate operations for facilitating the secure sharing of content among multiple endpoints according to some embodiments of the inventive subject matter. Referring to FIG. 5, operations of an agent/server device 140a, 140b, 140c begin at block 500 where an agent/server device 140a, 140b, 140c receives an invitation to join a communication session from, for example, the collaboration server 150. The invitation may comprise an email with a URI/URL link for example. The invitation may also include a unique identifier that identifies the communication session. This may be, for example, an IMS label. The agent/server device 140a, 140b, 140c initiates an outgoing connection to the communication session via the VIA the VNC bridge 152 and MCU 155 at block 505. At block 510, the agent/server device 140a, 140b, 140c establishes communication with a user/client device 120, 130 via the communication session through the IMS network 110. The communication session may be based on SIP and a VNC screen sharing session may be setup using VNC server module 325 running on the agent/server device 140a, 140b, 140c and a VNC client module 480 running on the user/client device 120, 130. The user/client device 120, 130 may be provided with access to one or more content items at block 515 that are stored at a remote storage location that is separate from the user/client device 120, 130. At block 520, the agent/server device 140a, 140b, 140c may authorize the user to modify the content item using the user/client device 120, 130 at the remote storage location without the content item being downloaded to the user/client device 120, 130 or transferred to another location that could compromise its security.

Referring now to FIG. 6, operations of a user/client device 120, 130 begin at block 600 where a client device may receive an invitation to join a communication session from, for example, the collaboration server 150. The invitation may comprise an email with a URI/URL link, an SMS message with a URI/URL link, or the like, for example. The invitation may also include a unique identifier that identifies the communication session. This may be, for example, an IMS label. The user/client device 120, 130 initiates an outgoing connection to the communication session via the VIA the VNC bridge 152 and MCU 155 at block 605. At block 610, the user/client device 120, 130 establishes communication with an agent/server device 140a, 140b, 140c via the communication session through the IMS network 110. The communication session may be based on SIP and a VNC screen sharing session may be setup using VNC server module 325 running on the agent/server device 140a, 140b, 140c and a VNC client module 480 running on the user/client device 120, 130. Access to a content item is received from an agent/server device 140a, 140b, 140c at block 620 where the content item is stored at a location that is remote from the user/client device 120, 130. A user authorization request is received at block 630 in which the user of the user/client device 120, 130 is asked to provide some type of information verifying the identity of the user. This may be, for example, a picture, credentials (e.g., driver's license or other form of identification), responses to a series of security questions, and the like in accordance with various embodiments of the inventive subject matter. The information identifying the user may be transmitted at block 640 and authorization to modify the content item may be received from the agent/server device 140a, 140b, 140c at block 650. At block 660, the user/client device 120, 130 may be used to modify the content item at the remote storage location with other user/client devices 120, 130 being blocked from modifying the content item and, in some embodiments of the inventive subject matter, viewing the content item while the content item is being modified. The content item is modified at the remote storage location with access being controlled by the agent/server device 140a, 140b, 140c such that there is no need to transfer the content item to a new location, such as downloading the content item to the user/client device 120, 130, which may compromise its security.

Some embodiments of the inventive subject matter may provide electronic signing ("esigning") of content. Conventional esign methods typically rely on a generally burdensome process that uses email and/or a web form to execute an esign process. Conventional esign processes generally do not provide a dynamic esigning capability when multiple participants are involved. Some embodiments of the inventive subject matter extend the ability to share content among multiple participants described above to allow for esigning of the content. In some embodiments, users or clients 120, 130 may use a noVNC browser via their devices or computers to establish a connection with the VNC bridge server 152. Agents 140a, 140b, and 140c may use the VNC server 325 embodied on their computers to also establish a connection with the VNC bridge server 152. The VNC bridge server 152 matches the incoming connections using a unique identifier generated by the collaboration server 150 as described above.

Various governmental authorities have laws and regulations governing the use of electronic signatures in commerce. To ensure compliance with legal or regulatory requirements for a valid electronic signature, embodiments of the present inventive subject matter may clearly identify and provide proof that the esign ceremony is properly executed. In some embodiments, an agent at an agent/server device/station 140*a* may manage or control an esign event and sequentially select the order in which users associated with user/client devices 120, 130 esign content, such as a document. Throughout the esign process, all documents to be signed are viewed by all participants (120, 130, 140*a*) without the need to transfer any files to the participants' computers. As indicated, all participants are able to view each other's esigning event, but are unable to have control of the signing event which is controlled by the agent/server device 140*a*. The agent/server device 140*a* delegates one party to have access to the document for signature without sending the document to the particular party.

Sequential control of the signer(s) is administrated via the agent's user interface, whereby during a video collaboration, the agent is able to select signer(s) from the participant list by a button click, which passes temporary control of the viewed document and ability for the document to be esigned. Upon successfully esigning the document package, the agent 140*a* regains control and then selects the next signer 120, 130 thereby continuing the process until the esign ceremony for all participants has been completed.

According to some embodiments, additional security may be provided through validation of a user's identity through the sharing of user credentials. For example, prior to esigning, the agent may seek to validate the user's identity by requiring a participating signer to hold a driver's license or some other form of identification in front of the signer's webcam. At this time, the agent may capture the image of the driver's license and simultaneously initiate a session that extracts some or all of the information from the driver's license including the license holder's picture. The information (e.g., name, address, city, state, zip, date of birth, driver's license number) that is extracted may be processed through a third-party verification entity for additional reviews that may include deceased and Office of Foreign Asset Control (OFAC) checks. The third-party verification entity may provide a validation certification of the user's identity based on a review of the credentials. The picture from the driver's license may be embedded in the esigned document near the esign signature field.

A signing ceremony may, however, involve only a single person operating a computer, mobile terminal, or other electronic device. No agent or other individual is present or involved in the signing ceremony. The intended signer could execute the document at his or her convenience, at the location of his or her preference, at any time. The person is presented with an opportunity to sign by giving an electronic signature. Typically, the document to be signed has been emailed to the individual and the individual is able to sign it at his or her convenience. A concern is that there is no assurance that the document is signed by the intended party. While it might be beneficial to have an "agent" present to witness the signing ceremony, it may be inconvenient or otherwise impractical.

According to some embodiments of the inventive subject matter, an email is sent to the intended signer with a request to sign. The email would contain a link to the collaboration server 150. In some embodiments of the inventive subject matter it may be similar to inviting the person to a video conference. The link may connect the intended signer to a "closing room" as a secure "peer to peer" connection. Once in the virtual "closing room," the process may be similar to the embodiments described above except that no one else, either other users or agents would be present. The peer to peer connection could involve an avatar rather than a real human "agent."

Once in the "closing room," the intended signer will then be asked either to present identification (e.g., hold up a drivers license or other appropriate ID) or answer a series of unique questions. These operations may be eliminated or reduced if less security is required or additional safeguards may be added if additional security is required. In some embodiments, the session may be video-recorded. Once it has been ascertained that the person is the intended signer, the document will be presented for signature.

The intended signer may be guided through the signing process through a series of audio and/or video prompts. The audio prompts may be given in the preferred language of the signer. One of the audio prompts may be "do you intend to sign this document?" or "are you signing this document freely, without coercion?" Additional instructions may also be included on the screen. However, in contrast to other esigning systems, the document to be signed will at all times remain protected on the collaboration server 150, information repository 160, server(s) 170, or other secure information storage location. The document is not downloaded to the signer's computer or electronic device, thus enhancing security.

In some embodiments of the inventive subject matter, the entire signing session may be video recorded by, for example, the agent/server device 140*a*, 140*b*, 140*c*. This may include, for example, the signing party and, in some embodiments, other participants in the signing ceremony. The video recording of the session, as well as date and time stamps, may be embedded in an audit trail log. Synchronizing a recording of the esigning ceremony including all of the participants in the ceremony with the actual execution of the document may provide improved security and reduce the risk of fraud. From the perspective of an intended signer, the process may be similar to other conventional e-signing event. Other than the requirement to present an ID or answer security questions, the process may be no more cumbersome for an intended signer than a conventional esigning process. However, embodiments of the inventive subject matter may enhance security through video recording and the use of security questions. Moreover, nothing is downloaded to the signing party's computer so the risk of hacking or other improper signing may be greatly reduced. Thus, embodiments of the inventive subject matter may provide the convenience of anytime/anywhere esigning while providing enhanced levels of security not found in conventional esigning systems.

Some embodiments of the inventive subject matter may be illustrated by way of example. Two agent stations 140*a* and 140*b* may represent real estate agents that are cooperating in generating a contract for the sale of a home. User devices 120 and 130 may represent the home buyer and home seller, respectively. The collaboration server 150 may facilitate the generation of a multi-party audio/video conference call between the two real estate agents 140*a*, 140*b* and the home buyer and home seller 120, 130. The real estate agents may access a contract on the server 170 and complete the agreed on terms of an offer for the purchase of the home by digitally editing the contract on the server 170 during the multi-party call. The buyer and seller may then digitally sign the contract on the server 170 during the call to fully execute the contract under the control of the agents 140*a*, 140*b*. One of the agents 140*a*, 140*b* may orchestrate the sequence and esigning of the contract by the home buyer 120 and the home seller 130. Thus, the contract document can be discussed, viewed, and edited by multiple parties during a multi-media call without the contract having to be transmitted from the server 170 to the various devices/stations, which can result in reduced confidentiality and security.

As described above, embodiments of the inventive subject matter may provide for esigning of content by one or more users or signers. In other embodiments, there may be multiple signers for a particular piece of content, such as a document, but it may be impractical or undesirable for all of the signers to be present at the same time. For example, there may be cases where two parties must sign an agreement, but neither wants to be in the same room, physically or virtually, with each other. Alternatively, the second party may be delayed in participating in the signing ceremony. Embodiments of the inventive subject matter may provide a "sequential signing" "capability" in which the first signer would enter the closing room and sign the content or document. At a subsequent point, the second and additional signers could enter the closing room and perform the same tasks. All of the individual signing sessions of the content or document would be aggregated into one complete closing.

Figure 7:
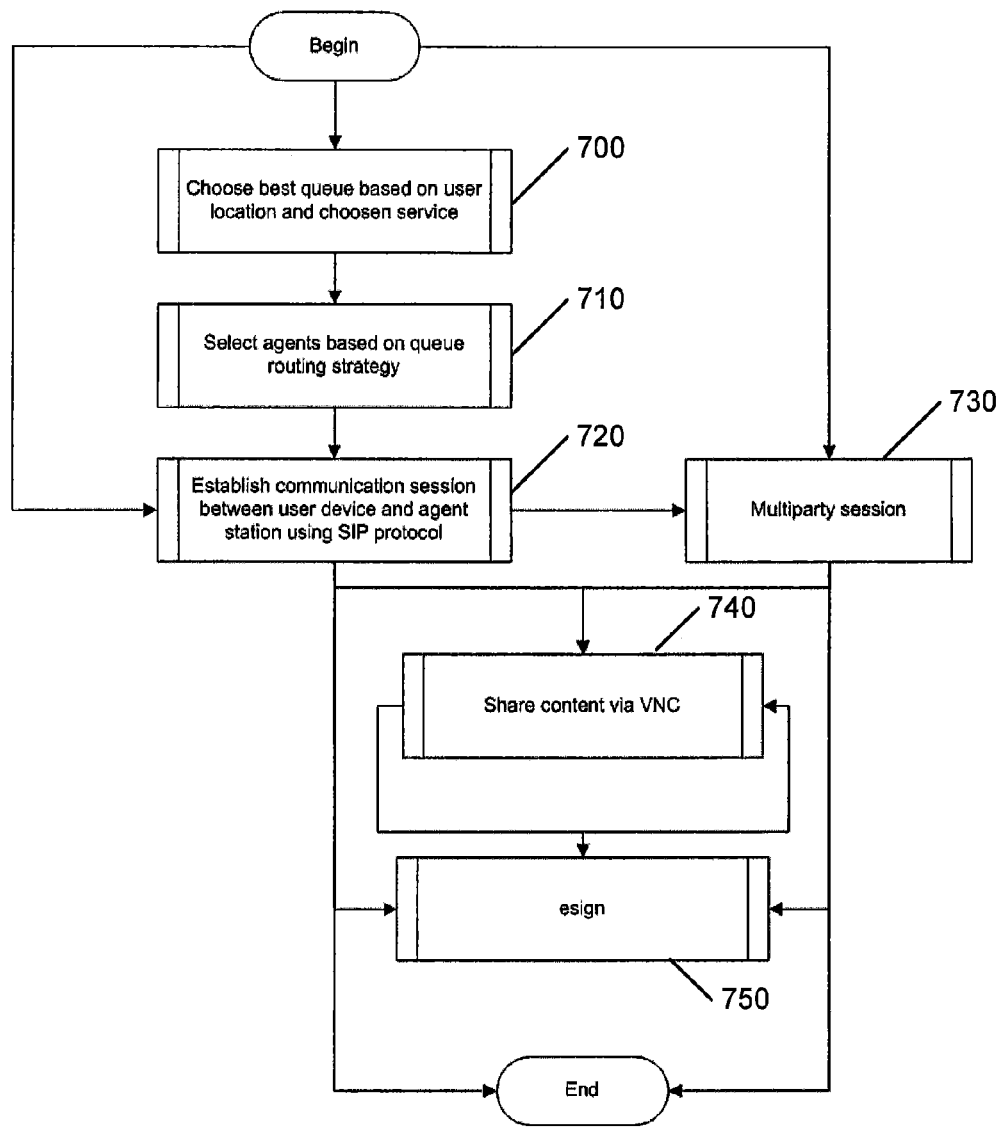

Referring now to FIG. 7, exemplary operations for operating a communication network to facilitate the secure sharing of content among multiple endpoints begin at block 700 where an agent queue is chosen based on the location of the user and the chosen service. At block 710, agents are selected based on the queue routing strategy. A communication session is established between a user device and an agent station using the SIP protocol at block 720. If multiple users are involved in a session, such as an esigning session, for example, a multiparty session is established at block 730. An agent may share content with a user at block 740 without transferring the content to the user's device. In a multiparty session, an agent may sequentially provide access to the content for each of the users by allowing only one user at a time to edit the content. A user may esign the content at block 750 when the agent provides the user with access to the content.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method of operating a server device, comprising:
performing operations as follows on a processor:
initiating an outgoing connection to a communication session, the communication session comprising a Virtual Network Computing (VNC) communication session and being managed by a collaboration server;
establishing communication with a client device via the communication session;
providing the client device with access to content that is stored at a remote storage location separate from the client device; and
authorizing a modification to the content at the remote storage location via the client device.

2. The method of claim 1, further comprising:
receiving an invitation to join the communication session; and
wherein initiating the outgoing connection comprises initiating the outgoing connection to the communication session responsive to receiving the invitation to join the communication session.

3. The method of claim 2, wherein the invitation comprises a unique identifier that identifies the communication session; and
wherein initiating the outgoing connection to the communication session comprises transmitting a unique identifier to the collaboration server that identifies the communication session.

4. The method of claim 1, wherein authorizing the modification to the content comprises:
requesting a user of the client device display a form of user identification through a video channel of the communication session;
receiving the user identification over the video channel; and
validating an identity of the user based on credentials contained on the user identification.

5. The method of claim 4, further comprising:
embedding a picture of the user of the client device in the content that is obtained from the user identification.

6. The method of claim 4, wherein validating the identity of the user further comprises:
communicating the credentials to an identity verification entity; and
receiving a validation of the identity of the user from the verification entity.

7. The method of claim 1, wherein authorizing the modification to the content comprises:
presenting a user of the client device with at least one question;
receiving responses from the user of the client device to the at least one question; and
authorizing the modification to the content responsive to the responses received from the user of the client device.

8. The method of claim 1, wherein authorizing the modification to the content comprises:
transmitting a prompt to a user of the client device that provides guidance in performing the modification to the content.

9. The method of claim 1, wherein the content is a document and the modification is an electronic signature.

10. The method of claim 1, wherein establishing communication with the client device comprises establishing communication with a plurality of client devices via the communication session.

11. The method of claim 10, wherein providing the client device with access to the content comprises:
providing the plurality of client devices with access to content that is stored at the remote storage location separate from the plurality of client devices.

12. The method of claim 11, wherein the client device is a first one of the plurality of client devices; and wherein authorizing the modification to the content at the remote storage location via the first one of the plurality of client devices comprises:
authorizing the modification to the content at the remote storage location via the first one of the plurality of client devices while blocking other ones of the plurality of client devices from modifying the content.

13. The method of claim 12, further comprising:
authorizing a modification to the content at the remote storage location via a second one of the plurality of client devices while blocking the other ones of the plurality of client devices from modifying the content.

14. The method of claim 12, further comprising:
video recording the modification to the content by a user of the first one of the plurality of client devices along with users of the other ones of the plurality of client devices; and
generating a log file with a date and time stamp when the modification to the content occurred.

15. The method of claim 1,
wherein establishing communication with the client device via the communication session comprises establishing communication with the client device using Session Initiation Protocol (SIP) signaling.

16. A method of operating a client device, comprising:
performing operations as follows on a processor:
initiating an outgoing connection to the communication session, the communication session comprising a Virtual Network Computing (VNC) communication session and being managed by a collaboration server;
establishing communication with a server device via the communication session;
receiving from a server device access to content that is stored at a remote storage location;
receiving a user authorization request from the server device;
transmitting information identifying the user to the server device;
receiving authorization to modify the content at the remote storage location; and
modifying the content at the remote storage location.

17. The method of claim 16, further comprising:
receiving an invitation to join the communication session; and
wherein initiating the outgoing connection comprises initiating the outgoing connection to the communication session responsive to receiving the invitation to join the communication session.

18. The method of claim 17, wherein the invitation comprises a unique identifier that identifies the communication session; and
wherein initiating the outgoing connection to the communication session comprises transmitting a unique identifier to the collaboration server that identifies the communication session.

19. The method of claim 16, wherein the user authorization request comprises a request for the user to display a form of user identification through a video channel of the communication session; and
wherein the information identifying the user comprises the form of user identification.

20. The method of claim 16, wherein the user authorization request comprises at least one question; and
wherein the information identifying the user comprises responses from the user of the client device to the at least one question.

21. The method of claim 16, wherein the content is a document; and
wherein modifying the content comprises modifying the content with an electronic signature.

22. The method of claim 16, wherein establishing communication with the server device via the communication session comprises establishing communication with the server device using a no VNC browser.

23. The method of claim 16,
wherein establishing communication with the server device via the communication session comprises establishing communication with the server device using Session Initiation Protocol (SIP) signaling.

24. A server device, comprising:
a processor; and
a memory coupled to the processor and comprising computer readable program code embodied in the memory that when executed by the processor causes the processor to perform operations comprising:
initiating an outgoing connection to a communication session, the communication session comprising a Virtual Network Computing (VNC) communication session and being managed by a collaboration server;
establishing communication with a client device via the communication session;
providing the client device with access to content that is stored at a remote storage location separate from the client device; and
authorizing a modification to the content at the remote storage location via the client device.

25. The server device of claim 24, wherein the operations further comprise:
receiving an invitation to join the communication session; and
wherein initiating the outgoing connection comprises initiating the outgoing connection to the communication session responsive to receiving the invitation to join the communication session.

26. The server device of claim 24,
wherein establishing communication with the client device via the communication session comprises establishing communication with the client device using Session Initiation Protocol (SIP) signaling.

27. A computer program product for operating a server device, comprising:
a non-transitory computer readable storage medium comprising computer readable program code embodied in the medium that when executed by a processor causes the processor to perform operations comprising:
initiating an outgoing connection to a communication session, the communication session comprising a Virtual Network Computing (VNC) communication session and being managed by a collaboration server;
establishing communication with a client device via the communication session;
providing the client device with access to content that is stored at a remote storage location separate from the client device; and
authorizing a modification to the content at the remote storage location via the client device.

28. The computer program product of claim 27, wherein the operations further comprise:
receiving an invitation to join the communication session; and
wherein initiating the outgoing connection comprises initiating the outgoing connection to the communication session responsive to receiving the invitation to join the communication session.

29. The computer program product of claim 27, wherein establishing communication with the client device via the communication session comprises establishing communication with the client device using Session Initiation Protocol (SIP) signaling.

30. A client device, comprising:
a processor; and
a memory coupled to the processor and comprising computer readable program code embodied in the memory that when executed by the processor causes the processor to perform operations comprising:
initiating an outgoing connection to a communication session, the communication session comprising a Virtual Network Computing (VNC) communication session and being managed by a collaboration server;
establishing communication with a server device via the communication session;
receiving from a server device access to content that is stored at a remote storage location;
receiving a user authorization request from the server device;
transmitting information identifying the user to the server device;
receiving authorization to modify the content at the remote storage location; and
modifying the content at the remote storage location.

31. The client device of claim 30, wherein the operations further comprise:
receiving an invitation to join the communication session; and
wherein initiating the outgoing connection comprises initiating the outgoing connection to the communication session responsive to receiving the invitation to join the communication session.

32. The client device of claim 30,
wherein establishing communication with the server device via the communication session comprises establishing communication with the server device using Session Initiation Protocol (SIP) signaling.

33. A computer program product for operating a client device, comprising:
a non-transitory computer readable storage medium comprising computer readable program code embodied in the medium that when executed by a processor causes the processor to perform operations comprising:
initiating an outgoing connection to a communication session, the communication session comprising a Virtual Network Computing (VNC) communication session and being managed by a collaboration server;
establishing communication with a server device via the communication session;
receiving from a server device access to content that is stored at a remote storage location;
receiving a user authorization request from the server device;
transmitting information identifying the user to the server device;
receiving authorization to modify the content at the remote storage location; and
modifying the content at the remote storage location.

34. The computer program product of claim 33, wherein the operations further comprise:
receiving an invitation to join the communication session; and
wherein initiating the outgoing connection comprises initiating the outgoing connection to the communication session responsive to receiving the invitation to join the communication session.

35. The computer program product of claim 33, wherein establishing communication with the server device via the communication session comprises establishing communication with the server device using Session Initiation Protocol (SIP) signaling.

36. A computer system, comprising:
an agent server;
a collaboration server that is configured to establish a communication session between the agent server and a plurality of client devices;
a Virtual Network Computing (VNC) bridge server that is configured to provide each of the agent server and the plurality of client devices access to desktops of other ones of the agent server and the plurality of client devices to view content that is stored at a remote storage location separate from the plurality of client devices; and
a Multipoint Control Unit (MCU) that is configured to provide one of the plurality of client devices with modification access to the content at the remote storage location while blocking other ones of the plurality of client devices from modifying the content responsive to a modification authorization from the agent server.

37. The computer system of claim 36, wherein the communication session is established over an Internet Protocol Multimedia Subsystem (IMS) communication network using Session Initiation Protocol (SIP) signaling.

38. The computer system of claim 37, wherein the IMS network comprises a Virtual Private Network (VPN).

39. The computer system of claim 36, wherein the collaboration server is configured to establish the communication session between the agent server and the plurality of client devices without using static identifiers for the agent server and the plurality of client devices.

40. The computer system of claim 36, wherein the collaboration server is further configured to establish the communication session using a Back-to-Back User Agent (B2BUA) server.

41. The computer system of claim 36, wherein the VNC bridge server is further configured to use secure websockets to provide each of the agent server and the plurality of client devices access to the desktops of the other ones of the agent server and the plurality of client devices.

42. The computer system of claim 36, wherein each of the plurality of client devices is an IP device.

43. The computer system of claim 36, wherein the agent server is further configured to video record the modification to the content by a user of the first one of the plurality of client devices along with users of the other ones of the plurality of client devices, and generate a log file with a date and time stamp when the modification to the content occurred.

* * * * *